No. 659,485. Patented Oct. 9, 1900.
J. A. MAIGNEN.
FILTER.
(Application filed Apr. 26, 1899.)
(No Model.)
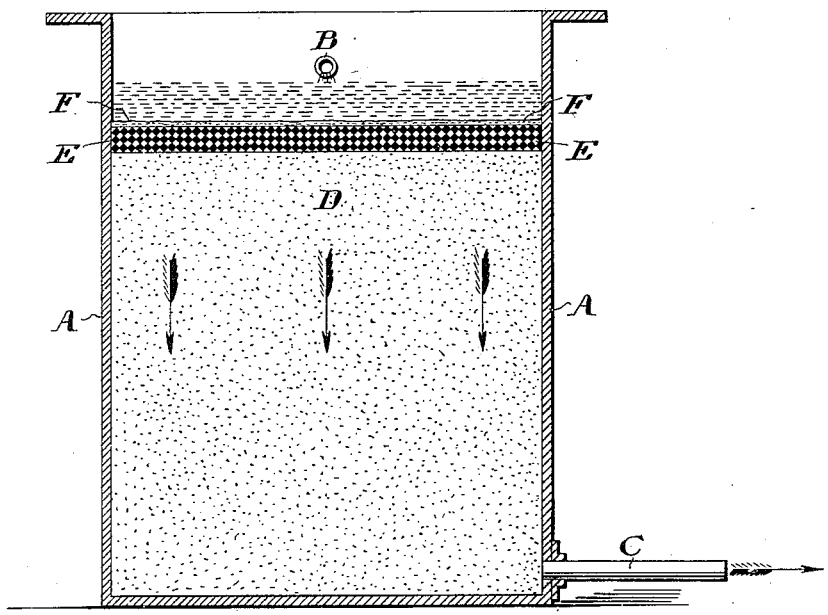
WITNESSES:
E. L. Fullerton.
Clifton C. Hallowell
INVENTOR:
JEAN A. MAIGNEN,
by Arthur E. Paige
Atty.
THE NORRIS PETERS CO., PHOTO-LITHO., WASHINGTON, D. C.

UNITED STATES PATENT OFFICE.

JEAN AUGUST MAIGNEN, OF PHILADELPHIA, PENNSYLVANIA.

FILTER.

SPECIFICATION forming part of Letters Patent No. 659,485, dated October 9, 1900.

Application filed April 26, 1899. Serial No. 714,516. (No model.)

*To all whom it may concern:*

Be it known that I, JEAN AUGUST MAIGNEN, of Philadelphia, in the State of Pennsylvania, have invented certain new and useful Improvements in Filters, whereof the following is a specification, reference being had to the accompanying drawing.

My invention relates to granular-bed filters in which the course of the water is downward through the filtering material. In filters of this class it has been found that the bulk of the impurities are removed from the water at the upper surface of the filtering material, the membraneous deposit on said surface, comprising solid particles previously suspended in the water, being, in fact, a more efficient filtering media than the granular material upon which it is superimposed.

In experimenting with the natural silt membrane and with artificial membranes such as I have described in my application, Serial No. 678,852, for Letters Patent of the United States, which now stands allowed, I have discovered that if a shallow layer of coarse granular material is interposed between the filtering-membrane and the fine granular material comprising the filter-bed merely sufficient to uphold said membrane from said material a more rapid flow of the filtrate is obtained. Moreover, an economy in the cleansing operation is thereby secured, due to the fact that the fine granular material beneath said layer remains comparatively clean, whereas in the old forms of filters, wherein the membrane rests directly upon the fine granular material, the impurities from the water penetrate to a considerable depth in said material and a large portion thereof must be removed at intervals for cleansing.

My present invention therefore consists in supporting a membraneous deposit of filtering media directly upon and within a shallow layer of coarse granular material, which serves merely as a support for said membrane at the top of a filter-bed composed of a mass of fine granular material.

In the accompanying drawing I have shown a typical embodiment of my invention wherein the course of the water is downward, as indicated by the arrows.

A is the inclosing casing, B the water-inlet pipe, and C the water-outlet pipe.

D is the fine granular material comprising the mass of the filter-bed, and E is the layer of coarse granular material upon the top of the mass D, such as gravel, quartz, or crushed stone of a size considerably coarser than the material of said mass. The membraneous deposit of filtering media F is supported by and contained within the layer E. The depth of the layer E will of course depend upon the nature of the water to be filtered and the membraneous deposit to be supported. Said layer will, however, be of merely such depth or thickness as to uphold said membrane F, which consists of some fibrous or powdery filtering media, such as asbestos fiber or comminuted charcoal.

It is to be understood that I have used the term "water" herein in a descriptive and not in a restrictive sense, as it is obvious that the precise nature of the liquid filtered is not of the essence of my invention. Moreover, I do not desire to limit myself to the precise proportions and relations of the parts which I have illustrated, as it is obvious that various modifications may be made without departing from the spirit of my invention.

I claim—

In a granular-bed filter, the combination with a mass of fine granular material, of a distinct layer of coarse granular material upon the top of said fine granular material, and an artificial membrane of fibrous or powdery filtering media, upheld by said distinct top layer, substantially as set forth.

JEAN AUGUST MAIGNEN.

Witnesses:
J. LOUIS BREITINGER,
ARTHUR E. PAIGE.